(12) United States Patent
Masaki

(10) Patent No.: US 6,255,401 B1
(45) Date of Patent: Jul. 3, 2001

(54) RUBBER COMPOSITION AND PNEUMATIC TIRE USING THE RUBBER COMPOSITION

(75) Inventor: Koji Masaki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/261,202

(22) Filed: Mar. 3, 1999

(30) Foreign Application Priority Data

Mar. 4, 1999 (JP) .................................................. 10-051688

(51) Int. Cl.⁷ .................................................. C08F 251/00
(52) U.S. Cl. .......................... 525/245; 525/181; 524/491; 524/474; 524/481; 526/348.7
(58) Field of Search .................................... 524/491, 474, 524/481; 526/348.7; 525/245, 191, 918

(56) References Cited

U.S. PATENT DOCUMENTS

| | | |
|---|---|---|
| 4,465,829 | 8/1984 | Graves . |
| 5,182,233 * | 1/1993 | Powers et al. ........................ 525/191 |
| 5,219,948 * | 6/1993 | Sorey et al. .......................... 525/314 |

FOREIGN PATENT DOCUMENTS 2 274 645   1/1976   (FR) .

OTHER PUBLICATIONS

Abstract of JP 03 028244A, Database WPI, Section Ch, Week 9113, Feb. 6, 1991.

Abstract of JP 03 296545 A, Database WPI, Section Ch, Week 9207, Dec. 27, 1991.

Alger, M, paragraph relating to polyisobutene, "Polymer Science Dictionary", 1997.

* cited by examiner

*Primary Examiner*—Nathan M. Nutter
*Assistant Examiner*—Olga Asinovsky
(74) *Attorney, Agent, or Firm*—Sughrue, Mion, Zinn, Macpeak & Seas, PLLC

(57) ABSTRACT

A rubber composition comprises, as a softener, a polymer obtained by cationic polymerization using a Lewis acid catalyst as an initiator. The polymer may be substantially a homopolymer of isobutylene, or substantially a copolymer of isobutylene and an aromatic vinyl compound. The homopolymer of isobutylene may be copolymerized with a conjugated diene monomer. The aromatic vinyl compound in the polymer may be styrene. In accordance with the present invention, a rubber composition exhibiting an excellent high hysteresis loss property without adverse effects on fracture properties can be provided. A pneumatic tire exhibiting excellent gripping ability can be provided by using the rubber composition in a tread.

19 Claims, No Drawings

RUBBER COMPOSITION AND PNEUMATIC TIRE USING THE RUBBER COMPOSITION

FIELD OF THE INVENTION

The present invention relates to a rubber composition and, more particularly, to a rubber composition exhibiting an improved high hysteresis loss property without any adverse effects on fracture properties, and to a pneumatic tire which uses the rubber composition and exhibits excellent gripping ability.

DESCRIPTION OF THE RELATED ART

Heretofore, aromatic softeners have frequently been employed to improve the high hysteresis loss property of a rubber composition.

However, this method has a problem in that aromatic softeners must be used in a large amount to obtain the high hysteresis loss property, and as a result, the fracture properties deteriorate.

To overcome the above problem, the use of polyisobutylene type softeners has been studied. However, polyisobutylene exhibits poor compatibility with diene rubbers which are suitably used as the rubber component of a matrix, and bleeding of polyisobutylene occurs at the surface of products obtained after molding. In particular, when a molded product is assembled with other parts to produce a final product, a problem arises in that adhesion between the parts is poor.

SUMMARY OF THE INVENTION

An object of the present invention is to provide a rubber composition having a combination of excellent fracture properties and an excellent high hysteresis loss property, which combination has been difficult to obtain with conventional rubber compositions.

As the result of intensive studies by the present inventor on rubber compositions containing various softeners, it was found that a rubber composition exhibits a combination of excellent fracture properties and an excellent high hysteresis loss property when the rubber composition comprises a polymer obtained by cationic polymerization, and in particular, a polyisobutylene or a copolymer of isobutylene and styrene (hereinafter, such a copolymer may be called as an isobutylene containing copolymer). The present invention has been achieved by utilizing this discovery.

Accordingly, in a first aspect of the present invention, a rubber composition comprising a rubber component and a polymer obtained by cationic polymerization using a Lewis acid catalyst as the initiator, the polymer preferably having a weight-average molecular weight of 2,000 to 50,000, is provided. It is preferable that the amount of the polymer is 5 to 200 parts by weight per 100 parts by weight of the rubber component.

It is preferable that the polymer is substantially a homopolymer of isobutylene or substantially a copolymer of isobutylene and an aromatic vinyl compound. When the polymer is substantially a copolymer of isobutylene and an aromatic vinyl compound, which is preferably styrene, the content of units of the aromatic vinyl compound bound in the copolymer is preferably 20 to 70% by weight of the weight of the copolymer.

It is preferable that the rubber component is a diene rubber. It is more preferable that the rubber component is a homopolymer of a diene compound or a copolymer of a diene compound and an aromatic vinyl compound.

It is preferable that the content of the aromatic vinyl compound bound in the isobutylene containing copolymer is greater than the content of the aromatic vinyl compound bound in the rubber component. It is more preferable that the content of the aromatic vinyl compound bound in the isobutylene containing copolymer is greater, by 15% by weight or more, than the content of the aromatic vinyl compound bound in the rubber component.

In a second aspect of the present invention, a pneumatic tire which is prepared by using any of the above rubber compositions at least in the road-contacting portion of the tread is provided.

DETAILED DESCRIPTION OF THE PREFERRED EMBODIMENTS

The rubber composition of the present invention is obtained by using a polymer obtained by cationic polymerization, such as polyisobutylene or a copolymer of isobutylene and styrene, in combination with the basic component of the rubber composition.

As the rubber component of the rubber composition, diene rubber is preferable, and homopolymers of diene compounds and copolymers of a diene compound and an aromatic vinyl compound are more preferable.

In the preferable embodiment of the present invention, the polymer used in combination with the basic component of the rubber composition can be obtained by cationic polymerization of an isobutylene monomer and an aromatic vinyl hydrocarbon (for example, styrene) in a hydrocarbon solvent by using a Lewis acid catalyst as the initiator. When an isobutylene monomer alone is polymerized, a homopolymer of isobutylene, i.e., polyisobutylene, is obtained. When a mixture of an isobutylene monomer and an aromatic vinyl hydrocarbon is polymerized, a copolymer of isobutylene and the aromatic vinyl hydrocarbon can be obtained.

The above polyisobutylene or isobutylene containing copolymer may further be copolymerized with a conjugated diene monomer such as 1,3-butadiene, isoprene, 1,3-pentadiene, 2,3-dimethylbutadiene, 2-phenyl-1,3-butadiene and 1,3-hexadiene.

In the present invention, examples of the aromatic vinyl compound monomer which is preferably used for preparation of the copolymer of isobutylene and an aromatic vinyl compound include styrene, α-methylstyrene, 1-vinylnaphthalene, 3-vinyltoluene, ethylvinylbenzene, divinylbenzene, 4-cyclohexylstyrene and 2,4,6-trimethylstyrene.

The homopolymer and the copolymer used in the present invention can be obtained by cationic polymerization of the monomers in accordance with, for example, the process described in "Experimental Methods of Polymer Synthesis" (published by Kagaku Dojin Co., Ltd.), page 201, or the process described in Kobunshi Kagaku, Vol. 18, pages 389 to 395.

In the present invention, the molecular weight of the above homopolymer or copolymer is not particularly limited and can be suitably selected in accordance with the object. For example, when the homopolymer or the copolymer is used as an oil which can be used as a softener in the rubber composition, it is preferable that the homopolymer or the copolymer has a relatively low molecular weight such as 2,000 to 50,000. When the molecular weight is less than 2,000, fracture properties tend to deteriorate. When the molecular weight exceeds 50,000, it becomes difficult to obtain the high loss hysteresis property. The molecular weight is more preferably 4,000 to 42,000.

The content of units of the aromatic vinyl compound bound in the copolymer used in the present invention is preferably 20 to 70% by weight, more preferably 30 to 70% by weight and most preferably 40 to 70% by weight of the copolymer. When the content is less than 20%, compatibility with the rubber component deteriorates, and the copolymer tends to bleed. When the content exceeds 70%, the modulus of the rubber composition increases, and the gripping property of the rubber composition (more precisely, the gripping property of a tire formed by using the rubber composition) deteriorates.

From the standpoint of compatibility, it is preferable that the content of the aromatic vinyl compound bound in the copolymer is greater than the content of the aromatic vinyl compound bound in the rubber component of the rubber composition. A difference of 15% by weight or more is most effective.

A solvent generally used in cationic polymerization can be suitably used as the solvent. For example, a hydrocarbon solvent such as an aliphatic hydrocarbon, an aromatic hydrocarbon or a halogenated hydrocarbon can be used. Among these solvents, an aromatic hydrocarbon is preferable, and toluene is more preferable.

Examples of the aliphatic hydrocarbon include pentane and hexane. Examples of the aromatic hydrocarbon include benzene, toluene and xylene. Examples of the halogenated hydrocarbon include chloromethane, chloroethane, methylene chloride, 1,1-dichloroethane, chloroform and 1,2-dichloroethane. These hydrocarbons can be used by itself or in combination of two or more. The aforementioned solvent may be used in combination with small amounts of other solvents. Examples of the other solvent include acetic esters such as ethyl acetate and organic compounds having a nitro group, such as nitroethane.

Compounds represented by $MX'_p$ can be used as the Lewis acid catalyst. In this formula, M represents a metal atom, X' represents a halogen atom and p represents an integer of 2 or more. Examples of such a compound include boron trichloride ($BCl_3$), aluminum trichloride ($AlCl_3$), tin tetrachloride ($SnCl_4$), titanium tetrachloride ($TiCl_4$), vanadium pentachloride ($VCl_5$), iron trichloride ($FeCl_3$), boron trifluoride ($BF_3$) and organoaluminum compounds such as chlorodiethylaluminum ($Et_2AlCl$) and dichloroethylaluminum ($EtAlCl_2$). However, the Lewis acid catalyst is not limited to the above compounds. Among these Lewis acid catalysts, titanium tetrachloride ($TiCl_4$) is preferable.

To obtain the homopolymer and the copolymer of the present invention, the temperature of polymerization is preferably in the range of −100 to −30° C. When the temperature is lower than −100° C., the polymerization activity tends to decrease. When the temperature exceeds −30° C., chain transfer reactions are intense and the molecular weight tends to decrease markedly.

To obtain the homopolymer and the copolymer of the present invention, the polymerization reaction may be conducted under a pressure naturally experienced during the reaction. It is generally preferable that the polymerization is conducted under a pressure which is sufficient for keeping the monomers substantially in the liquid phase. However, a high pressure may be applied, where necessary, in accordance with individual substances to be polymerized, the diluent, and the polymerization temperature. The pressure may be applied by a suitable method, such as pressurizing the reactor with a gas which is inert to the polymerization reaction.

In general, it is preferable that water, oxygen, carbon dioxide and other catalyst poisons are removed from all substances which take part in the polymerization processes, such as the components of the initiator, the solvents and the monomers.

In the present invention, the amount of the polymer obtained by the cationic polymerization is not particularly limited and is suitably selected in accordance with the application of the rubber composition. For example, when the polymer is used as a softener in a rubber composition for a tread of a tire, it is preferable that the polymer is used in an amount of 5 to 200 parts by weight per 100 parts by weight of rubber component. When the amount is less than 5 parts by weight, the effect of improving the high hysteresis loss property deteriorates. When the amount exceeds 200 parts by weight, fracture strength tends to deteriorate.

In the rubber composition of the present invention, conventional softeners such as an aromatic oil can be used in combination. When conventional softeners are used in combination, it is preferable that the total amount of the softeners, i.e., the total amount of the homopolymer or the copolymer used in the present invention and the conventional softeners, does not exceed 200 parts by weight per 100 parts by weight of rubber component. When conventional softeners are used in combination, it is preferable that the homopolymer or the copolymer used in the present invention is used in an amount of 15% by weight or more of the total amount of the softeners to sufficiently exhibit the effects of the present invention.

The rubber component used in the present invention is not particularly limited. It is preferable that the rubber composition comprises a diene rubber as the rubber component. A homopolymer of a diene monomer, a copolymer of diene monomers, and a copolymer of a diene monomer and an aromatic vinyl monomer are more preferable. Examples of the rubber component include natural rubber (NR), synthetic isoprene rubber (IR), polybutadiene (BR), styrene-butadiene copolymers (SBR), butyl rubber (IIR), ethylene-propylene-diene copolymers (EPDM) and acrylonitrile-butadiene copolymers (NBR). Among these rubbers, BR and SBR are more preferable for use in a tread. The rubber composition of the present invention may be constituted of a single type of these rubber components or of a mixture of two or more types of rubber components.

The rubber composition of the present invention may further contain substances generally used in the rubber industry, such as a filler, a vulcanizing agent, and an antioxidant.

In the second aspect of the present invention, a pneumatic tire having both a good fracute property and a good gripping property at the same time is provided by using a rubber composition of the present invention as a tread rubber composition.

Although the structure or the size of the tire of the present invention is not particularly limited and can be chosen as each case requires, the invention can be more effectively realized when the tire is of a type which is required to show a good performance at a high speed, like a high performance passenger car tire. The present invention is particularly effective when used in a tire having a multi-layered tread, and in such a case, it is even "required" to apply the rubber composition of the present invention to at least the outermost layer of the tread which contacts the road while the tire is running.

EXAMPLES

The present invention will be described more specifically with reference to the following examples. However, the present invention is not limited to the examples. In the examples, part and % means part by weight and % by weight unless otherwise mentioned. Various measurements were made in accordance with the following methods.

(1) Physical Properties of Polymer

The weight-average molecular weight (Mw) of a polymer was measured by gel permeation chromatography using a GPC apparatus HLC-8020, manufactured by TOSO Co., Ltd.; columns GMH-XL (two columns in series), manufactured by TOSO Co., Ltd. By using differential refractive indices (RI), the Mw of the polymer was calculated from the results of gel permeation chromatography. Herein, the results of GPC of the molecular weight of monodisperse polystyrenes are used as references.

The content of the bound styrene in a polymer was calculated from the ratio of integrated values in a $^1$H-NMR spectrum (a proton magnetic resonance spectrum).

To evaluate the compatibility, 30 parts by weight of a polymer used in the present invention was added to 137.5 parts by weight of a high styrene SBR (manufactured by JSR Corporation; tradename, TO120) in cyclohexane and the obtained mixture was cast to prepare a thin film. Transparency of the prepared film was evaluated by visual observation. The higher the transparency, the better the compatibility and the better the resistance to bleeding. The results are expressed as excellent, good or fair.

(2) Physical Properties of Rubber Composition

The high hysteresis loss property of a rubber composition was evaluated from tan δ which was measured by using a mechanical spectrometer, manufactured by Rheometrix Company, at a shearing strain of 5%, a temperature of 60° C. and a frequency of 15 Hz. The larger the tan δ, the better the high hysteresis loss property.

For the evaluation of the fracture properties, tensile strength at break was measured in accordance with the method of Japanese Industrial Standard K6301-1995.

(3) Tire Performance

The evaluation of tire performance (the gripping ability) was carried out in the following manner.

First, how the gripping ability was evaluated for Examples. 1–7 is described.

Four test tires prepared by using the rubber composition of Comparative Example 1 were fixed to a 1500 cc passenger car, and the car was driven ten laps on a course in a proving ground. The best time of the ten laps was noted. Then, another set of four tires were prepared by using the formulation of Comparative Example 2 (herein the formulation of Comparative Example 1 was altered by increasing the amount of aromatic oil contained by 10 parts by weight), and were tested in the same way as above to obtain the best time of the ten laps. The difference between the best time of the ten laps of the formulation of Comparative Example 1 and the best time of the ten laps of the altered formulation of Comparative Example 2 was calculated (i.e., the difference in time was calculated), and was used as a control value (hereinafter referred to as "control value I").

Then, with respect to each formulation of Examples 1–7, four tires were prepared according to each formulation, and each set of tires was subjected to the same testing procedure described above to obtain a best time of the ten laps. The difference between the obtained best time of the ten laps and the best time of the ten laps with the formulation of Comparative Example 1 was calculated for each of Examples 1–7, and the differences were expressed as indices, with the above-mentioned control value I being an index of 100.

Second, the gripping ability for Example 8 was evaluated in basically the same manner as for Examples. 1–7.

Specifically, four test tires were prepared according to the rubber composition of Comparative Example 3 and the best time of the ten laps was noted using those tires. Another best time of the ten laps was noted using another set of four tires prepared according to the formulation of Comparative Example 4 (herein the formulation of Comparative Example 3 was altered by increasing the amount of aromatic oil contained by 10 parts by weight). The difference between the best time of the ten laps of the formulation of Comparative Example 3 and that of Comparative Example 4 was calculated, and was used as a control value (hereinafter referred to as "control value II").

Then, with respect the formulation of Example 8, four tires prepared according to the formulation was subjected to the same testing procedure described above to obtain a best time of the ten laps. The difference between the obtained best time of the ten laps and the best time of the ten laps with the formulation of Comparative Example 3 was calculated, and the difference was expressed as an index, with the control value II being an index of 100.

Third, the gripping ability for Example 9 was evaluated in basically the same manner as other Examples 1–8.

Four test tires were prepared according to the rubber composition of Comparative Example 5 and the best time of the ten laps was noted using those tires. Another best time of the ten laps was noted using another set of four tires prepared according to the formulation of Comparative Example 6 (herein the formulation of Comparative Example 5 was altered by increasing the amount of aromatic oil contained by 10 parts by weight). The difference between the best time of the ten laps of the formulation of Comparative Example 5 and that of Comparative Example 6 was calculated, and was used as a control value (hereinafter referred to as "control value III").

Then, with respect the formulation of Example 9, four tires prepared according to the formulation was subjected to the same testing procedure described above to obtain a best time of the ten laps. The difference between the obtained best time of the ten laps and the best time of the ten laps with the formulation of Comparative Example 5 was calculated, and the difference was expressed as an index, with the control value III being an index of 100.

Preparation of Polymer

Materials which had been dried and purified in advance were used for the polymerization unless otherwise mentioned.

Into a 300 ml eggplant-shaped flask which had been dried and purged with nitrogen, 200 ml of toluene, 12.0 g of isobutylene and 15.4 g of styrene monomer were placed. After adding 0.75 mmol of $TiCl_4$ as an initiator, the polymerization was carried out at −78° C. for 2.5 hours. The polymerization system was homogeneous and clear without any formation of precipitates from the start through the end of the polymerization. The conversion was about 100%.

To the polymerization solution, methanol was added and, after drying, copolymer A was obtained as a rubbery material. The content of bound styrene, the weight-average molecular weight and the compatibility of this copolymer were measured.

The results are shown in Table 1.

TABLE 1

| Copolymer | A | B | C | D | E |
|---|---|---|---|---|---|
| Content of bound styrene in copolymer (%) | 55 | 55 | 55 | 35 | 20 |
| Weight-average molecular weight | 5000 | 25000 | 41000 | 5000 | 5000 |
| Compatibility | excellent | excellent | excellent | good | fair |

Copolymers B to E were obtained in accordance with the same procedures as those described above except that the amount of the initiator $TiCl_4$ and the amounts of isobutylene and styrene were changed. The content of bound styrene, the weight-average molecular weight and the compatibility of these copolymers were measured. The results are shown in Table 1.

Rubber compositions having different formulation were prepared by adding one of the above copolymers A to E into the basic formulation of the rubber composition which is shown in Table 2. The type of the rubber component, the type of the copolymer (A to E), the amount of aromatic oil used as the extender, the amount of other aromatic oil, the amount of the copolymer, and the total amount of the softener (the amount of aromatic oil used as the extender+ the amount of other aromatic oil+the amount of the copolymer) in Examples 1 to 9 and Comparative Examples 1 to 3 were changed as shown in Table 3.

The high hysteresis loss property and the fracture properties of the prepared rubber compositions were evaluated. The results are shown in Table 3.

TABLE 2

| Rubber component | 100 parts by weight |
|---|---|
| Softener | varied |
| Carbon black*1 | 100 |
| Stearic acid | 2 |
| Zinc oxide | 3 |
| Antioxidant*2 | 1 |
| Vulcanization accelerator*3 | 0.6 |
| Vulcanization accelerator*4 | 1.2 |
| Sulfur | 1.5 |

*1N234; Siest 7HM, tradename, manufactured by Tokai Carbon Co. LTD
*2N-phenyl-N'-isopropyl-p-phenylenediamine
*3 2,2'-dithiobisbenzothiazole
*4 1,3-diphenylguanidine the pneumatic tire regardless of the amounts of the rubber component, carbon black and the softeners.

In summary, in accordance with the present invention, a rubber composition exhibiting an excellent high hysteresis loss property without a deterioration in fracture properties can be provided. By using the rubber composition in a tread, a tire exhibiting excellent gripping ability can be provided.

What is claimed is:

1. A rubber composition comprising:
   a rubber component; and
   a polymer obtained by cationic copolymerization of isobutylene and an aromatic vinyl compound in a method that substantially all the monomers are added to the polymerization system before the polymerization using a Lewis acid catalyst as an initiator is carried out.

2. A rubber composition comprising:
   a rubber component; and
   a polymer obtained by cationic polymerization in a method that substantially all the monomers are added to the polymerization system before the polymerization using a Lewis acid catalyst as an initiator is carried out, wherein the polymer is substantially a homopolymer of isobutylene having a weight average molecular weight of 2,000 to 50,000.

3. A rubber composition according to claim 1 or 2, wherein the polymer is copolymerized with a conjugated diene monomer.

4. A rubber composition according to claim 3, wherein the conjugated diene monomer is a monomer selected from the group consisting of 1,3-butadiene, isoprene, 1,3-pentadiene, 2,3-dimethylbutadiene, 2-phenyl-1,3-butadiene and 1,3-hexadiene.

TABLE 3

| Example | | 1 | 2 | 3 | 4 | 5 | 6 | 7 | | 8 | | 9 |
|---|---|---|---|---|---|---|---|---|---|---|---|---|
| Comparative Example | 1 | | | | | | | | 2 | | 3 | |
| Rubber component | TO120*1 | TO120 | TO120 | TO120 | TO120 | TO120 | TO120 | TO120 | TO120 | TO120 | NF531*2 | NF531 |
| Softener | | | | | | | | | | | | |
| total amount | 100 | 100 | 100 | 100 | 100 | 100 | 100 | 100 | 90 | 90 | 100 | 100 |
| amount of aromatic oil used as extender | 37.5 | 37.5 | 37.5 | 37.5 | 37.5 | 37.5 | 37.5 | 37.5 | 37.5 | 37.5 | 37.5 | 37.5 |
| amount of aromatic oil used in mixing | 62.5 | 52.5 | 22.5 | 0 | 22.5 | 22.5 | 22.5 | 22.5 | 52.5 | 12.5 | 62.5 | 22.5 |
| amount of copolymer | — | 10 | 40 | 62.5 | 40 | 40 | 40 | 40 | — | 40 | — | 40 |
| type of copolymer | — | A | A | A | B | C | D | E | — | A | — | D |
| Strength at break | 100 | 100 | 102 | 99 | 103 | 106 | 98 | 92 | 100 | 101 | 100 | 101 |
| High loss property | 100 | 105 | 115 | 118 | 112 | 110 | 110 | 105 | 100 | 116 | 100 | 109 |
| Gripping property | — | 110 | 230 | 250 | 210 | 180 | 170 | 100 | 0 | 220 | — | 180 |

*1High styrene SBR, manufactured by JSR Corporation
*2BR, manufactured by Asahi Kasei Kogyo Corporation Pneumatic tires of the size 185/70R14 with a tread having a cap/base structure were prepared by using each of the above rubber compositions in the ground-contacting portion (cap layer) of a tread, and performance of the tires (gripping properties) was evaluated. The results are also shown in Table 3.

As for the evaluation of fracture property and high hysteresis loss property, the results of Comparative Example 1 were used as a basis of reference for the results of Examples 1 to 7, and the results of Comparative Examples 2 and 3 were used as a basis of reference for the results of Examples 8 and 9, respectively.

As shown by the results of the Examples and Comparative Examples, remarkable effect could be obtained with respect to the high hysteresis loss property and the gripping ability by using the rubber composition of the present invention in 5. A rubber composition according to claim 1, wherein the aromatic vinyl compound is styrene.

6. A rubber composition according to claim 1, wherein the polymer obtained by cationic polymerization is a copolymer of isobutylene and an aromatic vinyl compound.

7. A rubber composition according to claim 1 or 2, wherein a content of the polymer is 5 to 200 parts by weight per 100 parts by weight of the rubber component.

8. A rubber composition according to claim 1 or 2, wherein the rubber component is a diene rubber.

9. A rubber composition according to claim 8, wherein the rubber component is a homopolymer of a diene compound or a copolymer of a diene compound and an aromatic vinyl compound.

10. A rubber composition according to claim 1, wherein a content of units of the aromatic vinyl compound bound in the copolymer is 20 to 70% by weight of the weight of the copolymer.

11. A rubber composition according to claim 1, wherein the rubber component contains an aromatic vinyl compound as a bound component, and a content of the aromatic vinyl compound bound in the copolymer is greater than a content of the aromatic vinyl compound bound in the rubber component.

12. A rubber composition according to claim 11, wherein the content of the aromatic vinyl compound bound in the copolymer is greater, by 15% or more, than the content of the aromatic vinyl compound bound in the rubber component.

13. A rubber composition according to claim 1 or 2, wherein the Lewis acid catalyst is a compound which is represented by $MX'_p$, wherein M represents a metal atom, X' represents a halogen atom and p represents an integer of 2 or more, and which is selected from the group consisting of boron trichloride ($BCl_3$), aluminum trichloride ($AlCl_3$), tin tetrachloride ($SnCl_4$), titanium tetrachloride ($TiCl_4$), vanadium pentachloride ($VCl_5$), iron trichloride ($FeCl_3$), boron trifluoride ($BF_3$) and an organoaluminum compound.

14. A rubber composition according to claim 1 or 2, wherein the polymer obtained by cationic polymerization is a softener in the rubber composition and the rubber composition further comprises additional softeners.

15. A rubber composition according to claim 14, wherein a total amount of softeners comprising the polymer and the additional softeners is 200 parts by weight or less per 100 parts by weight of the rubber component.

16. A rubber composition according to claim 14, wherein an amount of the polymer is 15% by weight or more of a total amount of softeners comprising the polymer and the additional softeners.

17. A pneumatic tire which is prepared by using a rubber composition described in claim 1 or 2 in at least a road-contacting portion of a tread of the pneumatic tire.

18. A rubber composition according to claim 13, wherein the organoaluminum compound is selected from the group consisting of chlorodiethylaluminum ($Et_2AlCl$) and dichloroethylaluminum ($EtAlCl_2$).

19. A rubber composition according to claim 14, wherein the additional softeners comprise aromatic oils.

* * * * *